Jan. 1, 1929.
R. W. BAILEY ET AL
1,697,629
AUTOMOTIVE BUS
Filed Feb. 16, 1925      8 Sheets-Sheet 6
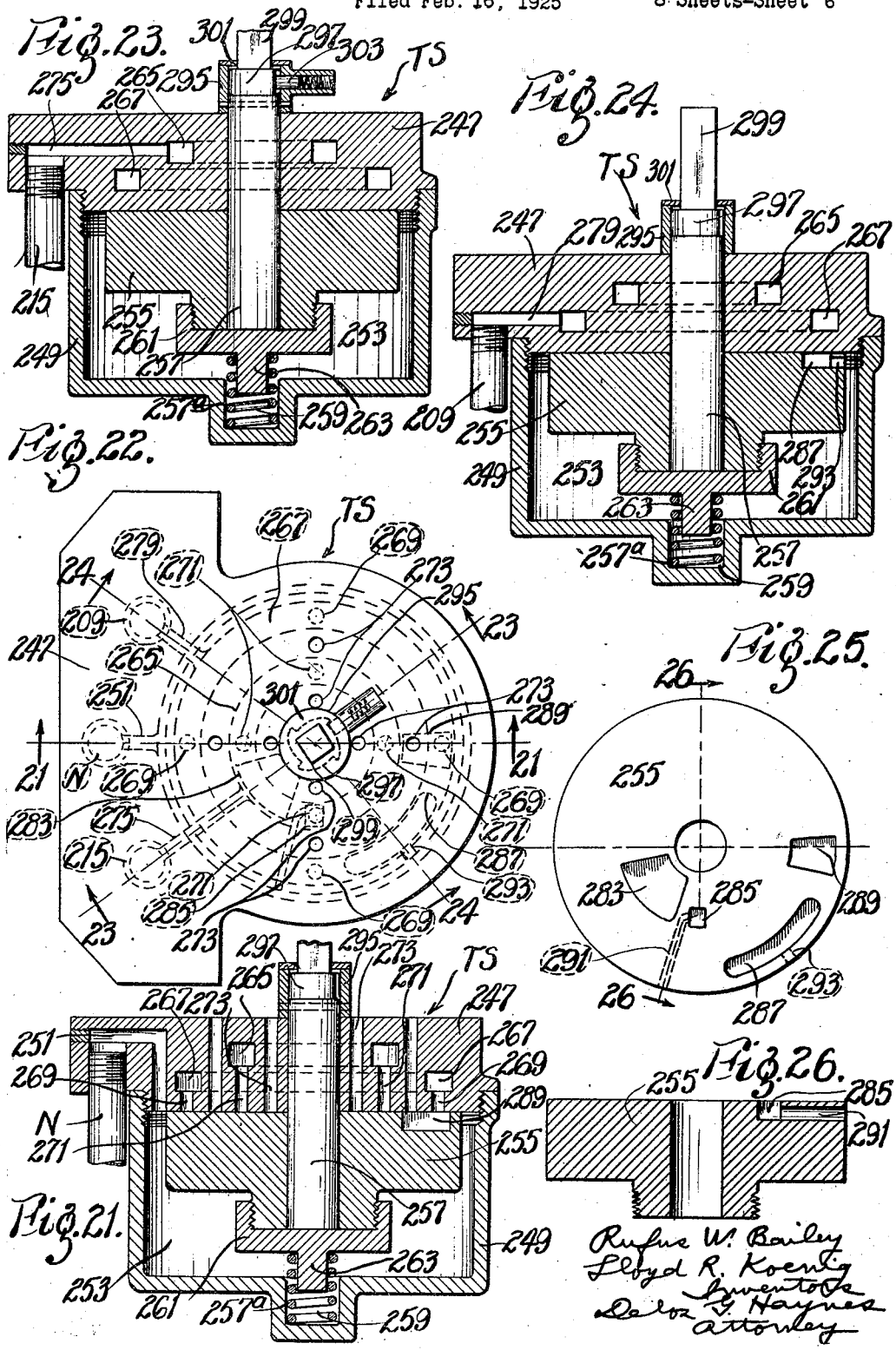

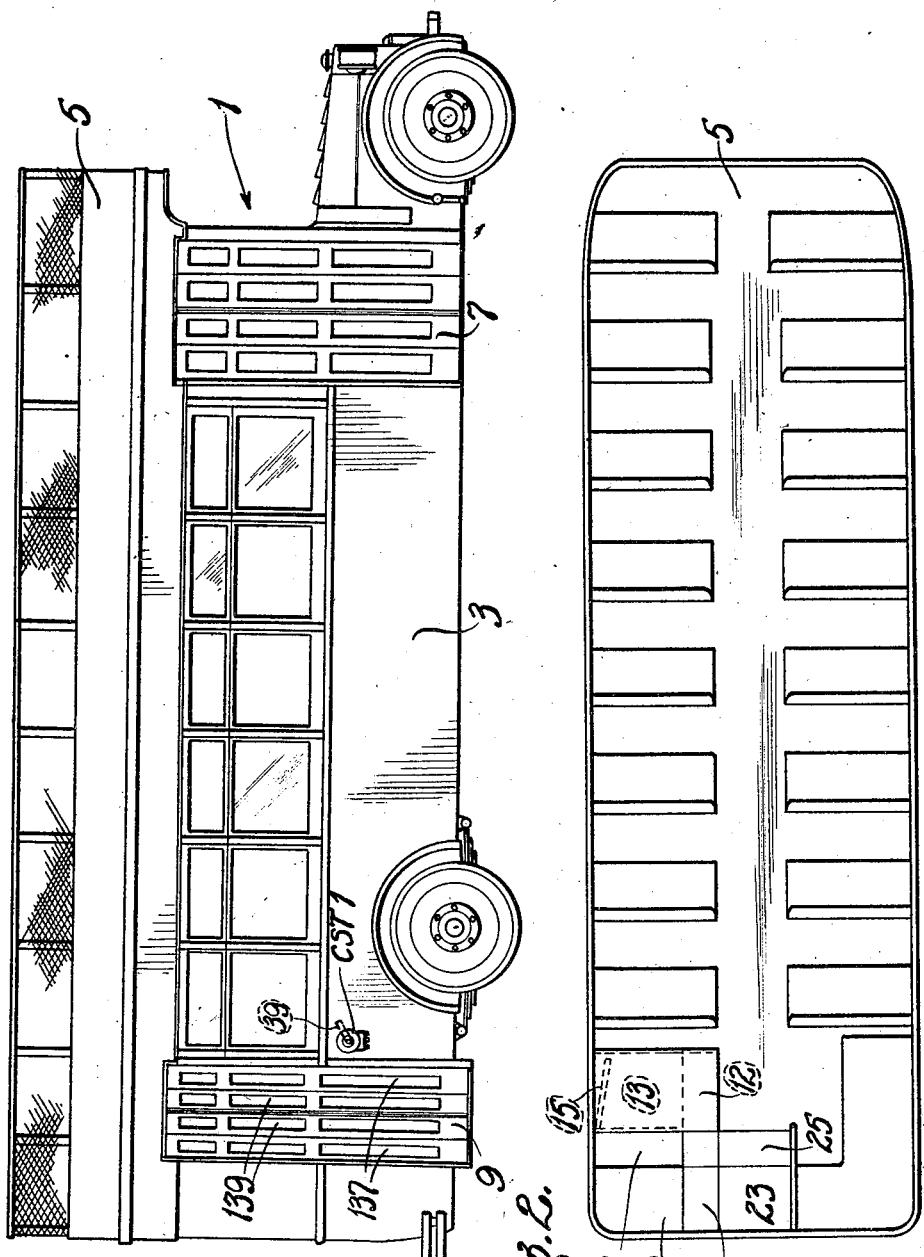

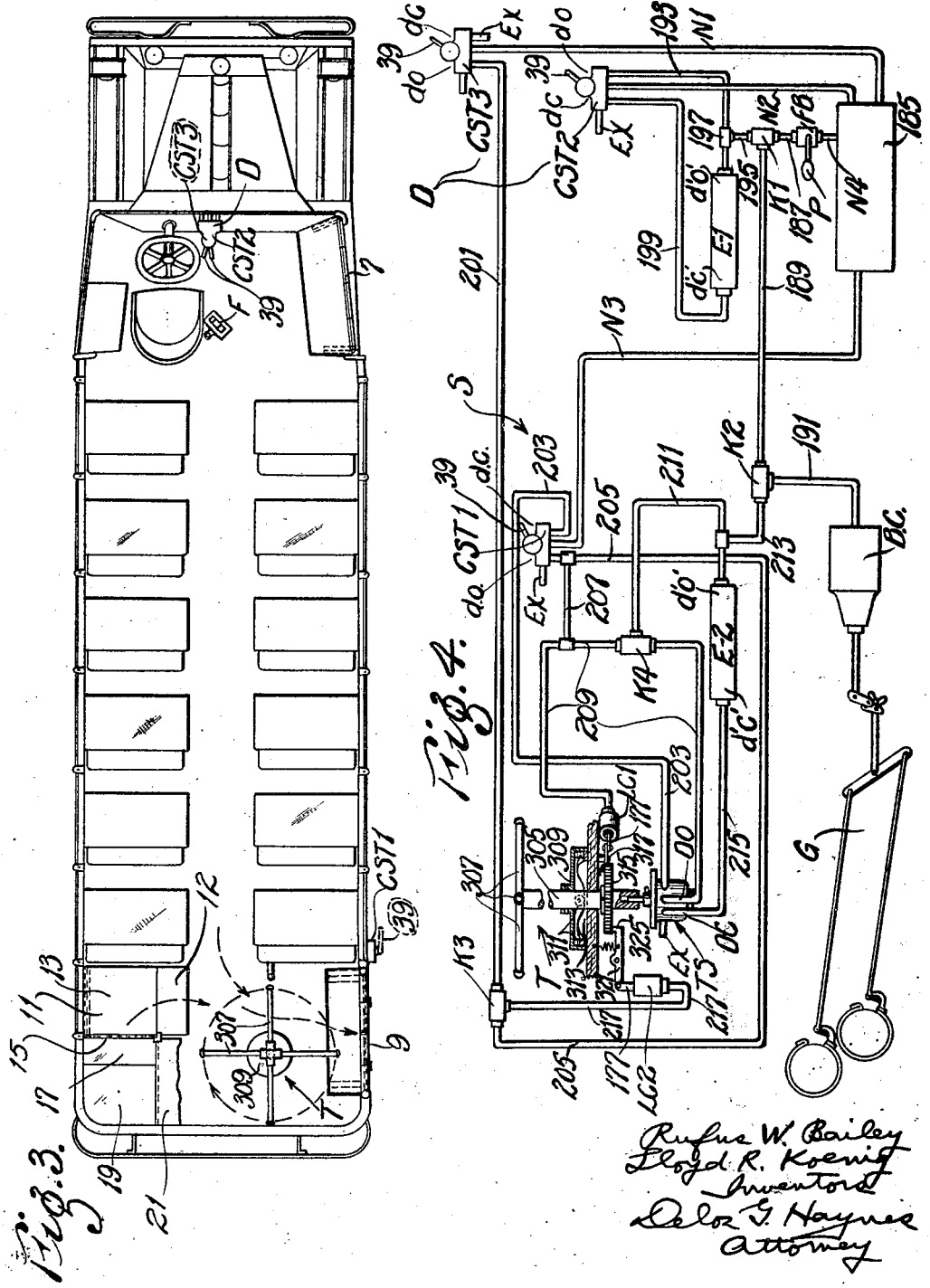

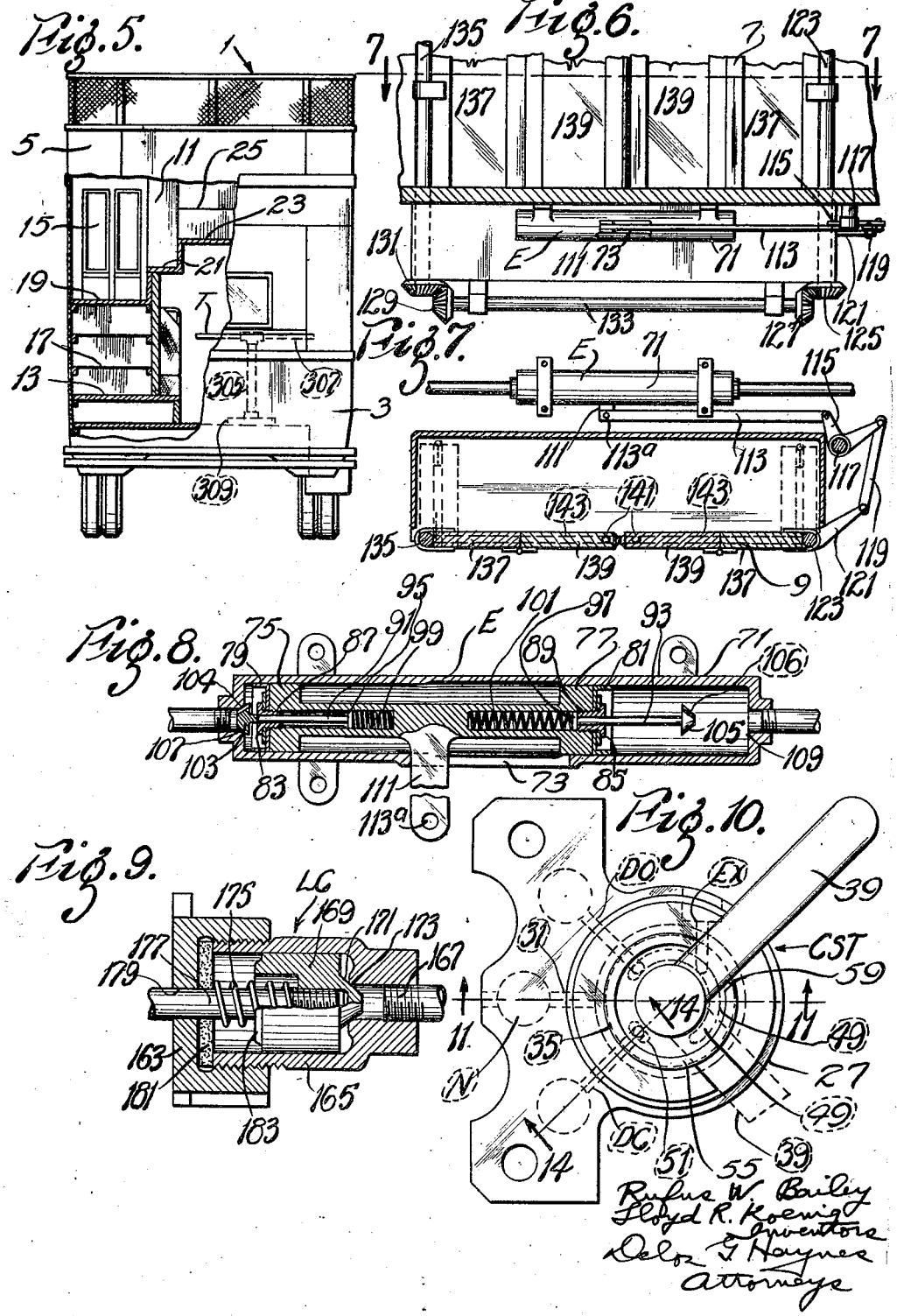

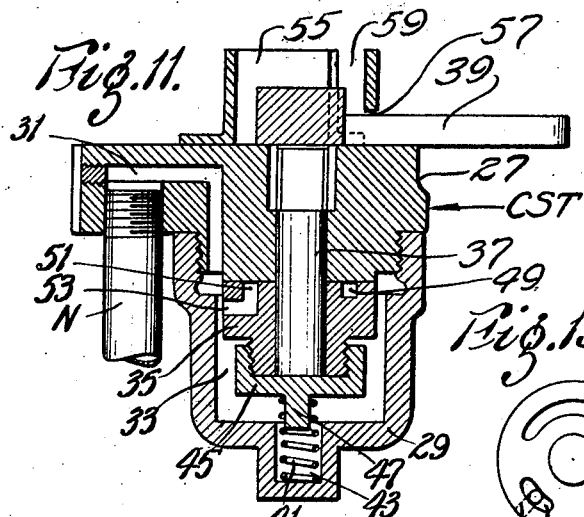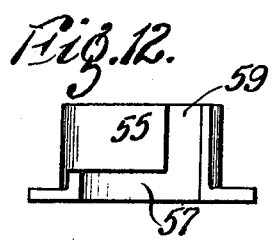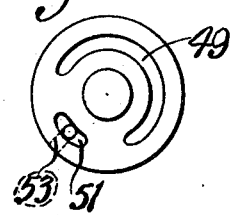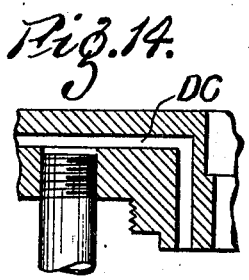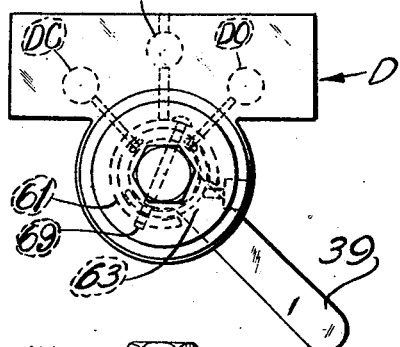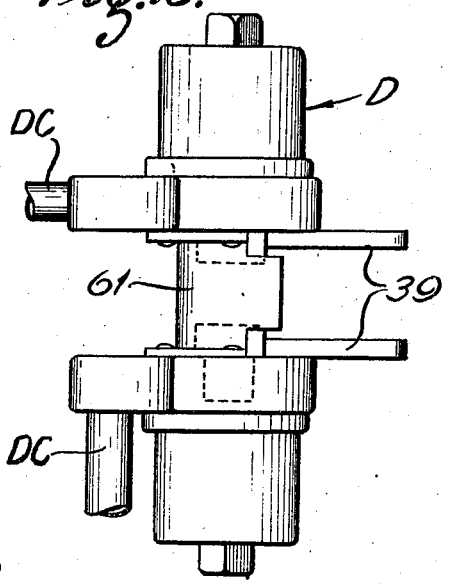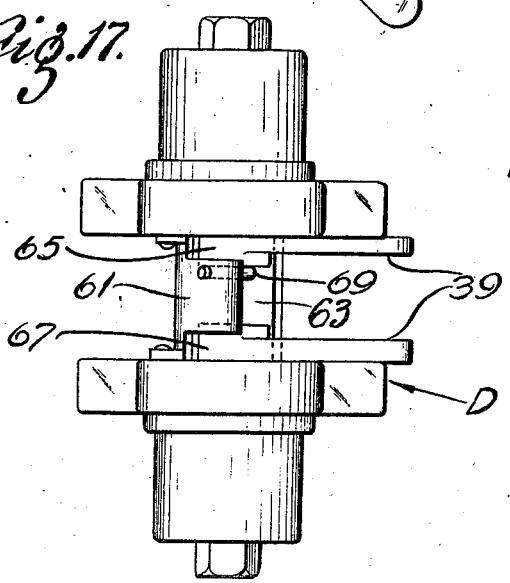

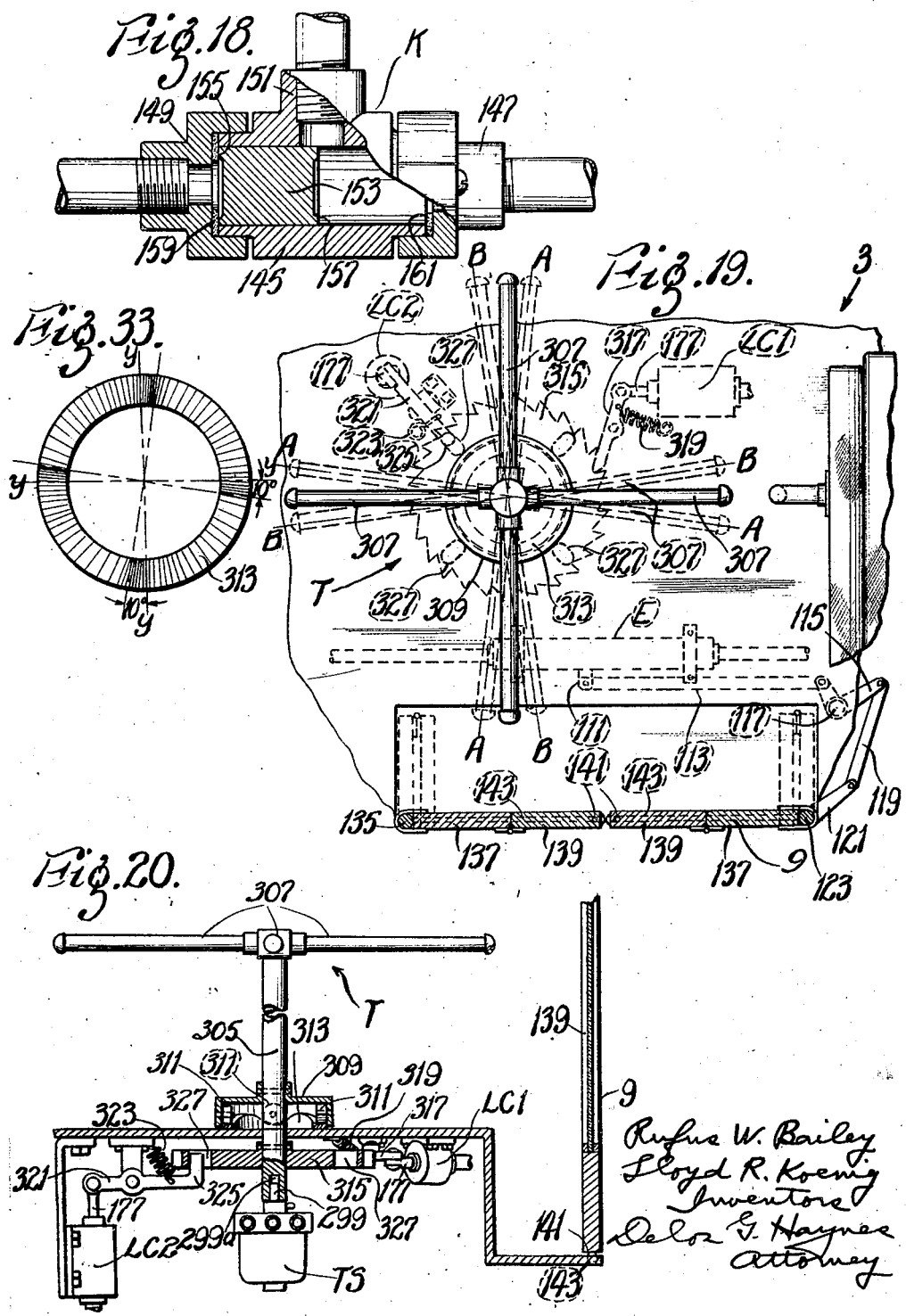

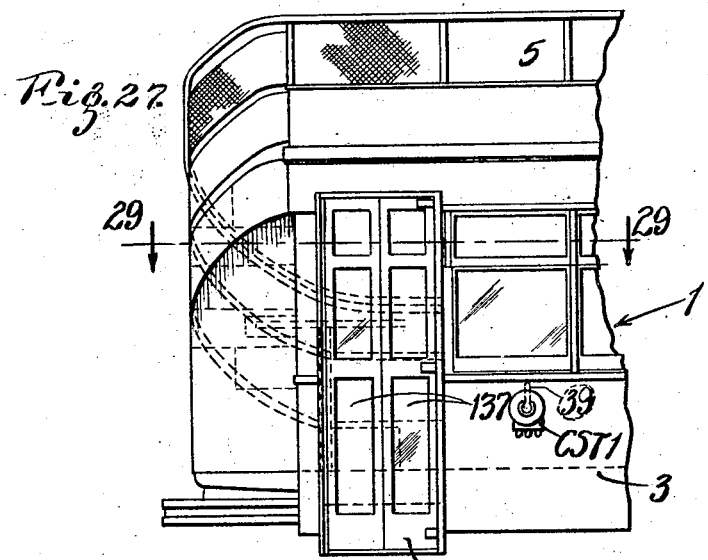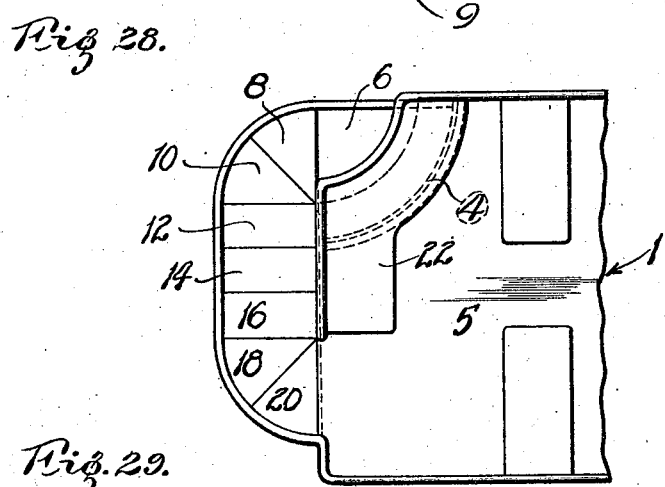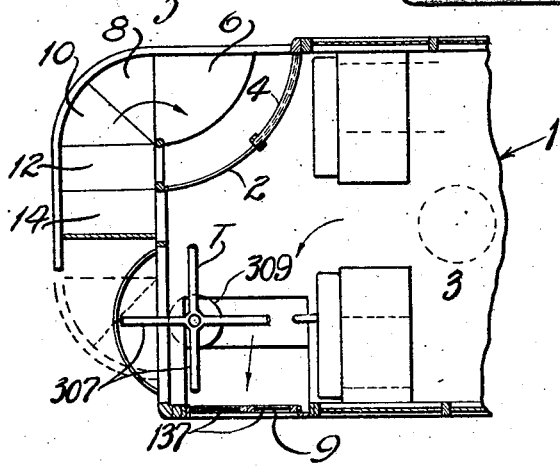

Jan. 1, 1929.  1,697,629
R. W. BAILEY ET AL
AUTOMOTIVE BUS
Filed Feb. 16, 1925   8 Sheets-Sheet 8
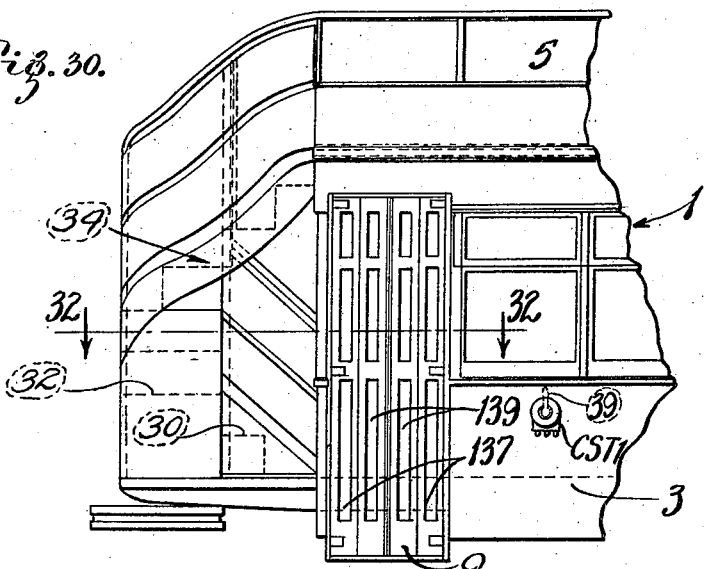
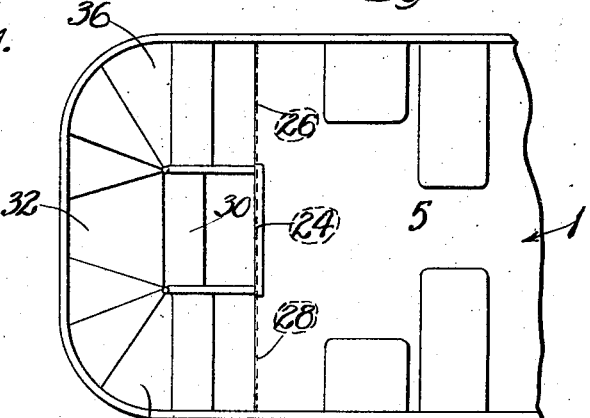
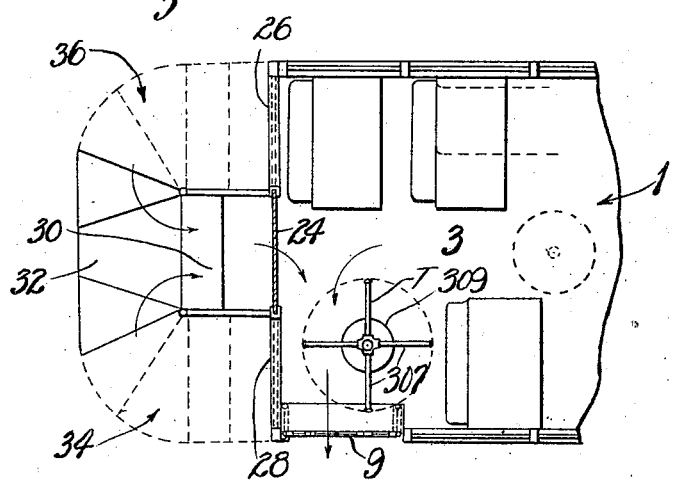

Patented Jan. 1, 1929.

1,697,629

UNITED STATES PATENT OFFICE.

RUFUS W. BAILEY, OF KANSAS CITY, AND LLOYD R. KOENIG, OF ST. LOUIS, MISSOURI; SAID KOENIG ASSIGNOR TO SAID BAILEY.

AUTOMOTIVE BUS.

Application filed February 16, 1925. Serial No. 9,416.

This invention relates to passenger vehicles, and with regard to certain more specific features, to motor coaches or busses for use on highways and/or metropolitan thoroughfares.

Among the several objects of the invention may be noted the provision of a motor coach equipped with exceedingly flexible door controls, operable under care of either one or two men; a coach involving in its operation only one-way passenger traffic on its lower deck; a double decked coach with a door in the passage between decks; one which may be successfully operated as a one or two-man controlled coach as occasion demands; and one which is particularly safe in operation under all exigencies of heavy and fast traffic.

The invention accordingly comprises the features of construction, combination of elements, and arrangements of parts which are exemplified in the structure hereinafter described, and the scope of the application of which will be indicated in the following claims.

In the accompanying drawings, in which is shown one of various possible embodiments of the invention, Fig. 1 is a side elevation of the motor coach;

Fig. 2 is a ground plan view of the upper deck and stairway;

Fig. 3 is a ground plan of the lower deck;

Fig. 4 is a schematic piping diagram for the pneumatic door and brake control system;

Fig. 5 is a rear elevation of the bus;

Fig. 6 is a detail in side elevation of the door opening linkage between the door opening engine and doors.

Fig. 7 is a horizontal section taken on the line 7—7 of Fig. 6;

Fig. 8 is an enlarged sectional detail of a door-opening engine;

Fig. 9 is an enlarged sectional detail of a lock operating cylinder;

Fig. 10 is a top plan view of one of the operating or control valves;

Fig. 11 is a vertical section taken on line 11—11 of Fig. 10;

Fig. 12 is a detail elevation of the handle safety-catch of the valve shown in Fig. 11;

Fig. 13 is a plan view of the rotatable valve proper, of the control valve shown in Fig. 11;

Fig. 14 is a fragmentary sectional view of the control valve body taken in line 14—14 of Fig. 10;

Fig. 15 is a top plan view of another control valve;

Fig. 16 is a left side elevation of Fig. 15;

Fig. 17 is a front elevation of Fig. 15;

Fig. 18 is a fragmentary sectional view of a two-way check valve;

Fig. 19 is a plan view of the turnstile showing alternate positions, and control features pertaining to the turnstile;

Fig. 20 is a diagrammatic section of the turnstile and control features pertaining thereto;

Fig. 21 is a vertical section of the turnstile control valve taken on the line 21—21 of Fig. 22;

Fig. 22 is a plan view of the control valve shown in Fig. 21;

Fig. 23 is a vertical section taken on the line 23—23 of Fig. 22;

Fig. 24 is a vertical section taken on the line 24—24 of Fig. 22;

Fig. 25 is a plan view of the valve disc of the turnstile control valve;

Fig. 26 is a vertical section taken on the line 26—26 of Fig. 25;

Fig. 27 is a fragmentary side elevation of the rear of the coach showing a modified form of rear end;

Fig. 28 is a top plan view of Fig. 27;

Fig. 29 is a horizontal section taken on the line 29—29 of Fig. 27;

Fig. 30 is a fragmentary side elevation showing another modified form of rear end;

Fig. 31 is a top plan view of Fig. 30;

Fig. 32 is a horizontal section taken on the line 32—32 of Fig. 30; and

Fig. 33 is a plan view of a barrel cam.

*Deck arrangement.*

Referring now more particularly to Figs. 1 to 3 there is illustrated at 1 a motor coach comprising an enclosed lower deck 3 and an open upper deck 5.

The lower deck 3 is provided forwardly thereof with a set of doors 7 to be used as an entrance to the coach. Rearwardly on said deck is provided a set of doors 9 to be used as an exit only, under normal conditions, but which may be used as an entrance also, under such abnormal conditions as will be described later.

The sets of doors 7 and 9 are on the right side of the coach.

Opposite the rear doors 9 on the left side of the coach, (see Figs. 2, 3 and 5) is located a stairway leading from the closed lower to the open upper deck. This stairway comprises a penthouse 11 under which are located step 12 and step-platform 13. Rearwardly in said penthouse 11 is placed a self-closing door 15 swinging forwardly on a center near the left wall of the coach. Outside of the penthouse and rearwardly thereof is the step 17 leading upwardly and to the rear of the coach. The step 17 leads directly to another step-platform 19 in the left rear corner of the coach. The platform 19 serves to direct a passenger toward the right side of the coach and up on the step 21. From here a third step-platform 23 is reached which serves to direct a passenger toward the aisle of the upper deck. However, another step 25 must be used to reach said aisle.

The ascent from the lower deck is made in eight steps as follows:

One; step 12:

Two; step-platform 13 (open door, turn left):

Three; steps 17 (out of penthouse and lower deck):

Four; step-platform 19 (turn left):

Five; step 21:

Six; step-platform 23 (turn left to front of coach):

Seven; step 25:

Eight; upper deck 5 (to seat).

Thus a passenger passes expeditiously from the lower to the upper deck, the door 15 closing behind him. The door prevents stray air currents from entering the enclosed lower deck and the partially enclosed stairway outside of the penthouse serves to lend safe passage to a passenger when the coach accelerates or decelerates, as well as to prevent wind from entering the door 15 when it is open.

Passengers leave the upper deck by means of the stairs just described. It will be noted that there is no open rear platform on this coach.

Referring to Figs. 27 to 29 there is shown one modification of the stairs and door above described. Here the door 2 is of the sliding type and arcuate in section. This arcuate door 2 is adapted to slide into an arcuate enclosure 4. The door 2 when closed and the enclosure 4 form a quarter-round enclosure leading to the upper deck 5.

Winding stairs comprising steps 6, 8, 10, 12, 14, 16, 18, 20, lead from the door 2 at the lower left rear of the coach, to the right rear of the coach on the upper deck. The space on the upper deck, corresponding to that given to the arcuate sliding door 2 on the lower deck 3, is used for a passenger's seat 22. Other features of this modified form such as the use of a turnstile at its exit will be disclosed hereinafter.

Another modified form of door and stairway is shown in Figs. 30 to 32. Here the door 24 is placed laterally and centrally of the coach and is adapted to slide within either of the partitions 26 or 28.

Rearwardly of said door 24 are placed two steps 30 and 32. Branching right and left from these steps 30 and 32 are two winding stairways 34 and 36 leading upwardly to the right and left rear sides of the upper deck 5. These stairways 34 and 36 permit of two way passenger traffic to and from the deck. Further features such as the use of a turnstile connected therewith will be noted hereinafter.

Attention is called to the fact that under normal operating conditions all passengers enter the lower deck at the front doors 7, and in choosing a seat, pass rearwardly on the lower deck. Upon leaving, they pass rearwardly to the rear doors thus obviating the necessity for any forward traffic in the aisle of the lower deck; that is, this is a one-way aisle. The advantages of such a condition are obvious.

The doors 7 and 9 and the braking system of the coach are under control of the compressed air system S, illustrated in Fig. 4.

*Control features.*

The system S, may, without an adjustment be put under control of one or two men, namely the chauffeur, or driver; or the driver and a street fare collector. The whole coach may be operated either by the driver unaided, or by the driver aided by a street collector. In order to introduce the street collector to help the driver, no change need be made in the coach construction or parts pertaining thereto.

The pneumatic system S involves several valve and door engine detail features which should be explained before the use of the system as a whole can be completely comprehended.

*Valves.*

For the use of the street collector, a valve CST is used (Figs. 10 and 11). This valve CST also forms the component parts of the driver's valve D. (Figs. 15, 16 and 17.)

The system also comprises check valves K (Fig. 18), a turnstile valve TS (Fig. 21), as well as door engines E (Fig. 8), and a lock operating cylinder LC. (Fig. 9.)

*Valve CST.*

The valve CST as illustrated in Figs. 10 and 11, comprises a body 27 with a lower chambered cup 29 screwed upwardly thereto. Pipe N brings air to the body portion 27 and cup 29. The bore 31 leads from the pipe N to a chamber 33 in cup 29. The chamber 33 contains a valve 35. This valve 35 has fitted thereto, the stem 37 whose flattened upper terminal receives a removable control lever 39. The valve 35 is kept seated against the body 27 by the coil spring 41 which reacts at its lower end in a pocket 43 of the cup 29 and at its upper end against a cap 45 screwed to the valve 35. The cap 45 has cast centrally therewith a lug 47 for aligning the spring 41.

The valve 35 has an arcuate groove 49 cut in its upper face which serves to alternately join ports DC and DO of the body 27 with an exhaust port EX. Likewise a groove 51 met by the passage 53 serves to connect the pipe N through bore 31 alternately with said ports DC and DO. The handle 39 can be applied to the valve stem 37 only when the groove 39 connects the port DO with the port EX and consequently when the pipe N is in communication with the port DC. This is true because of the crown-piece 55 fastened to the top of body 27, which, due to the lateral slot 57 permits oscillations of the lever 39, but because of the vertical slot 59, equal in width to the width of lever 39, will not permit taking off the handle 39 except at one position such as described.

The operation of the CST valve is as follows:

When the handle 39 is in the solid line position shown in Figs. 10 and 11 it may be applied to or taken from the valve stem 37 as permitted by the slot 59 of the crown piece 55. This corresponds to such a position of the valve ports as will put the supply pipe N in communication with port DC which corresponds to a door-closed position of one of the door engines, the door engine in question receiving its supply through this valve. Meanwhile the portion of the engine which otherwise opens the doors is exhausting to port DO through groove 49 to atmosphere, through port EX.

If the handle 39 be set over to the dotted line position of Fig. 10 it can not be removed. This is its door-open position. Then supply pipe N feeds the port DO which leads to the door-opening side of the door engine. The engine then operates to open the doors and in the meantime its door-closing end exhausts to port DC through groove 49 to atmosphere through port EX. The handle 39 can only be removed when the doors are shut, thus obviating accidents due to operators leaving coach doors open when changing posts. Each operator carries a handle 39 so that unauthorized persons cannot tamper with these valves.

Valve D.

The driver's valve D (see Figs. 15, 16 and 17) is a compound mechanism comprising two CST valves fastened together, one above the other, the upper one inverted and adjusted so that a door-open position of its handle 39 corresponds to the door-open position of the handle 39 of the valve beneath it. Here the crown piece 55 is replaced by a twin-crown piece 61 which at once serves as a coupling joining the two CST valves and as a safety piece, forcing the operator to leave the valve with a proper door-closed setting. The vertical slot 63 of the twin-crown piece replaces the former slot 59 of the crown 55, and the horizontal slots 65 and 67 replace the slot 57. When the upper handle 39 is inserted in position a pin 69 is slipped into holes drilled laterally of the crown piece just below the lowermost surface of the handle 39. This pin 69 keeps the handle from dropping down although the handle may be oscillated for operation. In Fig. 16 the inlet pipe N for the upper valve CST is placed horizontally for purposes of convenient piping.

The object of compounding these valves into one is to bring handles 39 into close proximity in order that the operator may easily throw both with one movement of the hand, yet operate them selectively if occasion demands. In Fig. 4 the component CST valves of valve D are shown separately but have the features noted above. The valve D is operated by the driver only.

Door engines.

The door-opening engine E (Fig. 8) each comprise a cylinder 71 slotted at 73. Within the cylinder is a double headed piston operable to right and left. The heads 75 and 77 of this piston are provided with leather packing rings 79 and 81 held in place by washers and bored plugs 83 and 85. The plugs 83 and 85 are screwed into holes 87 and 89 bored longitudinally of the piston. The bored plugs serve as bearings for rods 91 and 93 put therethrough. The rods 91 and 93 are flared on their ends within the holes 87 and 89, and said flares 95 and 97 are backed by springs 99 and 101 set in the holes 87 and 89. These springs tend to hold the rods 91 and 93 outwardly from the holes. The rods 91 and 93 are provided with valves 103 and 105 at the rod ends opposite the flares. These valves are slotted at 104 and 106 respectively. The valves 103 and 105 are adapted to seat themselves in seats 107 and 109 at the ends of the cylinder 71. Centrally of the piston is provided an arm 111 extending laterally from said piston out through the slot 73 and adapted by means of a pin-hole 113$^A$ to operate the door opening linkage shown in Figs. 6 and 7.

The operation of the door engine proper is started from the, say door-closed position, shown in Fig. 8. Air is admitted through a pipe from the left. The valve 103 is forced from its seat and the piston with arm 111 is pushed toward the right as pressure builds up in the left end of the cylinder. In the meanwhile the charge of air which has been present in the right-hand end of the cylinder 71 is being forced out of pipe at the right end of the cylinder to an exhaust. This goes on at a rapid rate until the valve 105 seats itself. The valve 105 seats itself just before the doors close completely and, by partially trapping air in the right end of the cylinder, materially decelerates the closing of the doors. However the doors continue to close, inasmuch as air is permitted to slowly escape from the right-hand end of cylinder 71 by means of the slot 106 in the valve 105. After or before the doors have been closed, the cycle of action within the cylinder 71 may be reversed by admitting air at the right and exhausting at the left. The transposition of the right-hand and left-hand pipes from exhaust to inlet pipes and vice versa is accomplished by means of the valves CST and D, the coordination of which will be described later.

Door linkage.

The door-opening linkage proper (for front door shown in Figs. 6 and 7 and for rear door, in Fig. 19) comprises a link 113 reaching from an arm 111 to a bell-crank 115 rotatably mounted upon a vertical shaft 117. This bell-crank 115 cooperates through link 119 with the crank arm 121 fastened to a rotatable vertical shaft 123 to which one half of a double folding door is fastened. The shaft 123 is geared by means of bevels 125, 127, 129 and 131 and intermediate shaft 133 to the vertical shaft 135 on the opposite side of the door frame. The shaft 135 has fastened thereto the other half of the above mentioned double folding door. Each half of the door has a leaf 137 fastened to one of the vertical shafts and another leaf 139 hinged to said leaf 137. The leaves 139 are equipped with pins 141 extending downwardly into slots 143 in the flooring directly beneath the leaves.

As the door engine moves the arm 111 (see Fig. 7) from left to right the door linkage moves so that cranks 115 and 121 rotate clockwise and likewise vertical shaft 123. The manner in which vertical shaft 131 is geared or linked to shaft 123 causes it to rotate in an opposite direction. The result of the motions of shafts 123 and 131 is that the leaves 137 are thrown inwardly while the leaves 139 hinge to such a position as shown in alternate dotted position, this being due to the pins 141 working in slots 143.

The door operating linkage so far described is applicable to both front and rear doors.

Check valves.

Each check valve K (Fig. 18) comprises a cylinder 145 with a pipe connection at both ends and one centrally thereof. Passages 147, 149 and 151 lead from these pipe connections to said cylinder. The latter passage 151 leads to the center of the cylinder 145 as shown. A free piston 153 is provided within the cylinder 145.

The piston 153 is provided with lips 155 and 157 which seat on gaskets 159 and 161 respectively. The piston 153 is of such length that the central port 151 is open whenever the piston 153 is seated at either end of the cylinder. Thus, air entering the cylinder through either of the passages 147 or 149 forces the piston 153 to the opposite end of the cylinder, where one of its lips cooperates with a gasket, thus sealing that end of the cylinder 145, while the incoming air passes out through the open central port.

Lock cylinder.

The lock cylinder (Fig. 9) comprises a body 163 into which is screwed a threaded cylinder 165. The cylinder 165 receives air through the passage 167. A piston 169 is constrained to seat its tapered end 171 on the valve seat 173 of said inlet passage 167. The piston is caused to seat in this way by means of the spring 175 coiled about a pin 177 screwed longitudinally into said piston. The pin 177 extends out through a hole 179 in the body 163. A relatively soft gasket 181 interposed between the body 163 and cylinder 165 cooperates with a lip 183 of said piston to seal the air which enters the cylinder through passage 167. The air enters the passage 167 when the lock cylinder is to be operated. Such entering air throws the piston away from its seat, thrusts pin 177 outwardly and seats lip 183 on the rather soft gasket 181. Air is then held within the cylinder. The spring returns the piston to its seat (at passage 167) when the air pressure to this device is released in a manner to be described hereinafter. The pin 177 is adapted at its outer end to be linked with other members of the door control system.

The turnstile valve TS (Figs. 21 to 26).

The general characteristics of this valve TS are somewhat like those of the above named valve CST. As in the case of said valve CST a supply pipe N leads air to the valve. The valve TS comprises a body 247 with a lower chambered cup 249 screwed upwardly thereto. A bore 251 leads from the pipe N to a chamber 253 in the cup 249. The chamber 253 contains a valve piece or disc 255. This valve piece 255 has fitted thereto the stem 257, which stem is rotatably mounted in the body 247. The valve 255 is kept seated against the body 247 by the coiled spring 257ᵃ which reacts at its lower end in a pocket 259 of the cup 249 and at its upper end against a cap 261 screwed to the valve piece 255. The cap 261 is provided with a lug 263 for aligning the spring 257.

The body 247 (Figs. 21 and 22) is provided with two circular cores 265 and 267. These cores are concentrically arranged with respect to the shaft 257.

Spaced at 90 degree intervals, the outer core 267 is provided with ports 269 leading down to the valve piece 255. At corresponding intervals, the inner core 265 is provided with like ports 271. At like intervals, eight exhaust ports 273 are bored completely through the body 247, one exhaust port adjacent to each of the ports 269 and 271.

The upper inner core 265 is connected by means of a lead core hole 275 (Fig. 23) with a pipe 215 adapted to lead air to the door closing side $d'$ $c'$ of a rear door engine $E^2$ whose action is to be described later. (See also Fig. 4.)

The lower outer core 267 is connected by means of a lead core hole 279 (Fig. 24) with a pipe 209 adapted to lead air to the door opening side $d'$ $o'$ of the above rear door engine $E^2$ to be described later (see also Fig. 4).

The valve piece 255 (Figs. 25 and 26) comprises the casting above described. It is faced smoothly on its upper surface in order that an air tight fit may be had between it and the body 247. The body 247 is correspondingly faced smoothly on its lower side. The upper face of the valve piece 255 is provided with four indentures 283, 285, 287 and 289. The indentures 285 and 287 are provided with sub-passages 291 and 293 respectively, adapted to lead air to said indentures from the chamber 253 of the cup 249.

The indenture 283 is of such radial width that it is adapted to put the ports 271 in successive communication with their respective inner adjacent exhaust ports 273 as the valve piece 255 is rotated.

Likewise the indenture 289 is of such radial width that it is adapted to put the ports 269 in successive communication with their respective inner adjacent exhaust ports 273 as the valve piece 255 is rotated.

The ported indentures 285 and 287 are adapted to put the ports 271 and 269, respectively, in communication with the valve chamber 253.

The indentures 285 and 289 are spaced at 90 degree intervals with respect to one another and encompass about 10 degrees of angular measure each. The indenture 289 should be somewhat wider in angular measure than the indenture 285 in order that exhaust connections may be made before inlet air connections are made.

The indentures 283 and 287 are spaced at 90 degree intervals also and encompass about 60 degrees of angular measure. The indenture 283 is somtwhat wider in angular measure than the indenture 287, for reasons stated in the paragraph above.

Assuming clockwise rotation in Figs. 25 and 22 the forward points of the indentures 283 and 287 are so placed with respect to the center lines that about 10 degrees of rotation is possible before these indentures register with their respective ports.

The indentures 285 and 289 are on the center lines as shown.

The said valve stem 257 is provided at its upper end with a cup 295 pinned thereto. This cup holds rotatably therein a ratchet 297. The ratchet has integrally formed therewith the upwardly extending squared shaft 299. A spring pressed pin 303, socketed in the cup 295 permits of a driving connection between the squared shaft and valve stem when said shaft rotates clockwise. Reversal of rotation breaks the connection because of the ratchet and pin. The friction between ports of the valve hold them in place when the ratchet is reversed. A washer 301 slipped over the squared shaft prevents dirt and moisture from entering the ratchet ports.

It is to be understood that all the valve ports may be designed to be operable in a reverse order when so desired. Thus the device to be described is made operable on such body constructions as shown in Figs. 30 to 32.

*The turnstile T (Figs. 4, 19 and 20).*

The turnstile T is placed preferably (not always) at the left side of the rear doors 9 and is adapted to block a passenger's ingress or egress when the driver so desires. It is also adapted to operate the rear doors when a passenger is permitted to leave the coach.

The turnstile comprises a vertical stem 305 on the upper end of which are mounted the cross members 307 spaced at 90 degrees. These cross members are placed so that a passenger must rotate them through approximately 90 degrees in order to leave the coach.

The stem 305 passes through the floor of the coach.

Pinned to the stem near the floor is the bell 309. Pinned to the inner surface of said bell 309 are four rollers 311 spaced thereon in positions corresponding to the 90 degree positions of the arms 307 at the upper end of said stem 305.

The rollers 311 roll on a barrel cam 313 made fast to the coach floor under said bell. The cam has four high spots and four low ones. The low spots are so placed with regard to the coach door that when the rollers are thereon the turnstile arms 307 are parallel and at right angles to the door by pairs respectively. Thus, because of the rollers' tendency to seek the low spots of the cam, the turnstile tends to remain in the position noted, namely, in such position as to normally block a passenger's exit. The high spots of the cam are placed alternately between the low spots.

Beneath the floor, on said stem 305, is pinned a ratchet wheel 315. A pivoted pawl 317 is adapted, by means of a spring 319, to be held against the teeth of said wheel 315. This pawl and the ratchet teeth permit only clockwise rotation of the wheel 315 and turnstile. However the pawl may be thrown out of engagement with the wheel 315 by means of the operation of one of the lock cylinders, LC¹, shown horizontally in Fig. 19 and linked to the pawl 317 by means of its pin 177. This lock cylinder LC¹ is under control of the street collector.

Another lock cylinder LC², under control of the driver, is vertically placed, and by means of its pin 177 is adapted to operate a rocker arm 321. This arm is held in normal position by a spring 323. Its normal position is one in which a lug 325 thereon engages one of a group of four slots 327, cut in the wheel 315. The slots 327 are cut at 90 degree intervals. The slots and the lug 325 are adapted to engage when the turnstile arms 307 are in the non-exit position described.

At the lower end of the stem 305 is placed the said turnstile valve TS. Its squared shaft 299 is held slidably in a square socket 299ª formed in the lower end of the stem 305. Evidently the turnstile is adapted to turn the valve stem while moving up and down on the cam 313. The squared shaft 299, as described, is adapted to turn the valve TS in a clockwise direction only.

*Timing of valve TS.*

Assuming the turnstile to be in the non-exit position, the valve TS is mounted so that its parts bear the relationship shown in Figs. 21 and 22. That is, the inner core 265 is in communication with the air supply and the door closed side $d'$ $c'$ of the rear door engine E², and the outer core 267 is in communication with an exhaust and the door open side $d'$ $o'$ of the rear door engine E². Thus the doors are held closed, as will be seen later.

Upon turning the turnstile (when it is possible to do so) through an angle of 10 degrees clockwise, the indentures 283 puts the core 265 in communication with the exhaust thereby putting the door closing side $d'$ $c'$ of the door engine E² in communication with the exhaust. An instant later air is admitted to the core 267 by way of the indenture 287 and a port 269. This air finds its way to the door opening side $d'$ $o'$ of the engine E² by way of pipe 209 (Figs. 4 and 22). In the meanwhile the indentures 285 and 289 have left their respective ports. The result is that the doors 9 begin to open when the turnstile handles 307 reach the alternate position A—A shown in Fig. 19.

The doors remain open as long as the indentures 283 and 287 perform the communicating functions noted.

The doors close after the indentures 283 and 287 have passed out of alignment with their respective ports and the indentures 285 and 289 have come into alignment with their second set of ports, thereby performing their function of closing the doors. The door closing event starts at the alternate position B—B shown in Fig. 19. The doors remain closed until the position A—A is reached. For one complete revolution of the turnstile the doors may be opened and shut four times, that is, if the turnstile is permitted to settle to the low points on the cam for periods of time. This feature is clarified hereinafter.

Should a passenger spin the turnstile in alighting it will settle to the low position on the cam which is the non-exit position for the arms 307 and door closed position (Fig. 22) of the valve TS. The low points are shown at lines Y—Y in Fig. 33.

It should be noted (Fig. 33) that the high points of the cam are placed within 10 degrees of the low points in a clockwise direction from door closed and non-exit position of the turnstile. Thus if the arms 307 are forced back to non-exit position by the cam before having gone 10 degrees beyond such a position, the valve TS is yet in a door-closed position (the proper ports still align) although the ratchet 297 of the valve TS is operable to prevent return to central position of said valve. The teeth on the ratchet wheel 315 are coarse and permit of some reverse turning of the turnstile. Of course after the 10 degree point has been reached the mechanism takes up a new position on the next successive 90 degree lines, inasmuch as gravity causes it to seek the next low level on the cam.

Normally a passenger would turn the device through about 80 degrees from the solid line position shown in Fig. 19. The door would thus immediately open. Immediately upon his alighting the device would take up the next solid line position at 90 degrees and the doors would close.

Should the passenger, as described, spin or, that which is the same, continuously turn the turnstile, the doors would not close upon him inasmuch as the indentures 285 and 289 are relatively narrow angularly. Thus they pass their ports quickly and the inertia of the door operating mechanism prevents the transitory door-closing connections from taking effect. These connections of course do take effect when the cam rollers settle in their lowest point to stay for a period, that is when passengers stop alighting. It is evident that because of said inertia effects, passengers have ample time to alight before the doors close, even though the mechanism has just been positioned at a low point on the cam.

The turnstile may be rotated in its exit direction only by releasing it from the action of the stop lug 325. The reason for this action will be explained herein.

The turnstile may be rotated in the reverse or inlet direction (counterclockwise) by releasing the pawl 317. The reason for this action will also be explained later. It should be said here, however, that if the pawl 317 is released, and counterclockwise rotation is effected, passengers may enter the coach at the rear door. The valve TS does not rotate counterclockwise because of its ratchet 297. Thus it retains its last (say door closed) position. The door may be opened by other means to be described, passengers may enter, and upon returning to clockwise rotation, the valve ports are picked up in the same relation to the turnstile arms as before. This is due to the fact that there are only four teeth on the ratchet 297. The proper 90 degree relationship between the valve positions and turnstile positions is thus always maintained for clockwise movement.

Pneumatic system.

Referring now to Fig. 4 in particular, the operation of the pneumatic system will be made clear. A supply tank 185 supplies compressed air to the system. There are four supply leads $N^1$, $N^2$ $N^3$, $N^4$, emanating from this tank 185.

Two leads $N^1$ and $N^2$ supply air to the system by way of the driver's valve D, said valve D being a compound of two similar valves $CST^2$ and $CST^3$ and operable with one movement (see Figs. 3 and 4). These valves $CST^2$ and $CST^3$ are of the CST type already described.

Supply lead $N^3$ supplies air to the system by way of the street collector's valve $CST^1$. The street collector's valve $CST^1$ is located on the outside of the coach in order that he may operate the rear doors 9 from the outside when it is imperative that fares be collected on the street and passengers admitted to the rear as well as the front doors. (See Figs. 3 and 4.)

The supply lead $N^4$ supplies the brake cylinder BC by way of the valve FB. The valve FB is a conventional air valve operable by means of the foot pedal P at the will of the driver. Check valves $K^1$ and $K^2$ are in this line to the brake cylinder BC. This line includes pipes 187, 189 and 191.

One of the component valves $CST^2$ of the driver's valve D receives the supply lead $N^2$. From its door open position $d.\ o.$ a pipe 193 leads to the door-opening side $d'\ o'$ of the front door engine $E^1$. A branch pipe 195 leads from a T 197 in line 193 to the check valve $K^1$ of the brake cylinder line. From the door-closed position $d.\ c.$ of the driver's valve $CST^2$ a pipe 199 leads to the door closing side $d'\ c'$ of the front door engine $E^1$.

The valve $CST^3$ of the driver's valve D is supplied by the line $N^1$. It is connected to a check valve $K^3$ by pipe 201.

The street collector's valve $CST^1$, fed by line $N^3$, has a pipe 203 leading from its door closed side $d.\ c.$ to the turnstile valve TS. This line 203 feeds air to the chamber 253 of said valve TS. From the door open side $d.\ o.$ of valve $CST^1$ a line 205 leads to the said check valve $K^3$. This line 205 is provided with a branch 207 leading to the circuit pipe 209.

This pipe 209 leads to the outside core 267 of the valve TS (Figs. 4 and 22). It also supplies air to said lock cylinder $LC^1$. It is provided with a check valve $K^4$. The check valve branch 211 leads to the door open side $d'\ o'$ of the rear door engine $E^2$. A branch 213 of the pipe 211 leads to the said check valve $K^2$.

A pipe 215 leads from the door closed side $d'\ c'$ of the rear door engine $E^2$ to the inside core 265 of the valve TS (Figs. 4 and 22).

The valve $K^3$ is provided with the branch 217 to the check valve $LC^2$.

In Fig. 4 the brake draft gear is shown conventionally at G and is operable under action of air in the brake cylinder B. C.

One-man operation.

If one man is to operate the coach the following possibilities of operation present themselves:

(a) *A stop is made and passengers wish to enter.*—In this case the driver uses the foot-brake pedal P to stop the coach and air goes from the tank 185, through pipe $N^4$ valve F. B. (now open), pipe 187, check valve $K^1$ to line 189, check valve $K^2$ to line 191, to brake cylinder B. C.; and the brakes are set. After the coach stops, he throws the handle of the valve $CST^2$ (this handle only if he is certain no one is leaving) to its door-open position $d.\ o.$ Air then leaves the tank 185 through pipe $N^2$ to valve $CST^2$, pipe 193 and T 197 therein, to the door opening side $d'\ o'$ of the front door engine $E^1$, whereupon the front door opens. Some of this air also branches off at T 197, through pipe 195, check valve $K^1$ (if the driver has now released the brakes), pipe 189, check valve $K^2$, pipe 191 to the brake cylinder B. C. to hold the brakes set if the driver should have failed to do so. The passengers now enter, deposit their fare in the box F (Fig. 3) and proceed to their seats. The driver throws the handle of valve $CST^2$ to its door-closed position $d.\ c.$ after all his passengers are aboard, whereupon air is led from the tank through line $N^2$, and pipe 199 to the door closing side $d'\ c'$ of the front door engine thus closing the front door. The air which went to the brake cylinder B. C. and door engine reverses its flow to the exhaust port of the valve $CST^2$, that port having been opened by throwing the valve to door-closed position (see description of CST valve).

Should the driver have inadvertently thrown the lever of the $CST^3$ valve also, (to its $d.\ o.$ position) air would have gone through pipe $N^1$ to pipe 201 and thence to the check valve $K^3$, line 217 and to the lock cylinder $LC^2$ thereby throwing the lug 325 out of register with its slot in the wheel 315. The turnstile would then be free to turn but no passenger being there to turn it, the rear door would not have opened.

Now, had a passenger desired to get off, he evidently would approach the rear door 9 after giving his signal. After the coach had stopped (assuming that the driver had released the turnstile as described) the passenger would, in passing toward the door, operate the turnstile in a clockwise direction. After the first ten degrees of rotation the valve TS would be turned so that the indenture 283 (Figs. 22 and 25) would connect a port 271 of the inside core 265 with an exhaust port 273 and the indenture 287 would connect the chamber 253 with a port 269 of the outside core 267. The flow of air would then be as follows:

Air leaving the tank 185 through the line $N^3$ would pass through the door closed side $d.\ c.$ of the street collector's valve $CST^1$ to pipe 203, thence to the chamber 253 of the valve TS, through passage 293, indenture 287, through a port 269 to the outer core 267, thence through passage 279 to pipe 209, check valve $K^4$, and line 211 to the door open side $d'\ o'$ of the rear door engine $E^2$. Incidentally, the branch pipe 213 would carry air to the brake cylinder B. C. by way of the check valve $K^2$ and pipe 191, if the driver had released the brakes. Thus the brakes would be reset.

Discharge from the door closing side $d'\ c'$ of the engine $E^2$ would take place through pipe 215 to passage 275 of the valve TS, to the inside core 265, a port 271, through the indenture 283, to an exhaust 273, thus permitting the engine to operate.

Upon the passenger's alighting, the turnstile would recenter itself. This would cause the indenture 285 to align itself with one of the ports 271 of the inner core 265. Likewise the indenture 289 would permit communication between the outside core 267 and exhaust by way of a port 269 and an exhaust port 273.

Air for door closing would take the following path.

From tank 185, through line $N^3$, valve $CST^1$ (door closed side $d\ c$), line 203, chamber 253 of valve TS, passage 291 to the indenture 285, thence up to the inner core 265 by way of a port 271, thence through passage 275 to pipe 215, and then to the door closing side $d'\ c'$ of the engine $E^2$.

In the meanwhile the door opening side $d'\ o'$ of the engine $E^2$ would exhaust through pipe 211, check valve $K^4$, pipe 209 to passage 279, the outer core 267, port 269, indenture 289 to an exhaust port 273. The brake cylinder B C would exhaust through the same passages after pushing air through pipes 191, check valve $K^2$ and pipe 213.

Upon recentering, the lug 325 would be free to drop into one of the slots 327 if the driver so desired it. He would normally cause this locking action to take place as the coach got under way, and in order to cause it, he would throw the $CST^3$ valve to door closed position $d\ c$ whereupon the lock cylinder $LC^2$ would exhaust by way of pipe 217, check valve $K^3$ and pipe 201 to the exhaust of said valve $CST^3$.

So far, no passenger could reverse the direction of the turnstile's rotation because of the action of ratchet 317.

*Operation by driver and street collector.*

If a street collector is used we have another situation.

(b) *Operation of the rear door by the street collector.*—The street collector, in so far as he is letting passengers in at the rear door, should not be dependent upon passengers leaving the coach for opening the rear door, nor on the driver.

Therefore should the street collector wish to open the door, he throws (by means of his insert lever) the outside valve $CST^1$ to its door-open position $d\ o$. Thereby air comes from the supply, through pipe $N^3$ to valve $CST^1$, through this valve position $d\ o$ to pipe 205, thence to check valve $K^3$ to pipe 217 and lock cylinder $LC^2$ whence the lug 325 is withdrawn from its locking position.

Simultaneously air has branched off from the line 205 by way of pipe 207 to the circuit 209. Air then goes two ways in said circuit 209. One way it goes to the lock cylinder $LC^1$ thereby causing the pawl 317 to withdraw from the wheel 315, and the other way it goes to the door open side $d'\ o'$ of the engine $E^2$ by way of check valve $K^4$ and pipe 211. Incidently the brakes are set as before described.

The rear door is now open and passengers may either alight or mount the coach turning the turnstile in either direction. The valve TS is not operable counter-clockwise, as previously described.

As soon as the street collector throws his valve $CST^1$ to door closed position $d\ c$, the air operable to close the rear door, takes the path already described for door closing position of valve TS. Of course the turnstile will recenter as usual. Exhaust from engine $E^2$ takes place as already described.

Simultaneously air exhausts from the lock cylinder $LC^2$, through pipe 217, check valve $K^3$, pipe 205 to the exhaust port of valve $CST^1$.

Likewise the lock cylinder $LC^1$ exhausts by means of pipes 209, 207 and 205 to the same exhaust port.

The brake cylinder BC exhausts through pipe 191, check valve $K^2$, pipe 213, pipe 211, check $K^4$, pipe 209, pipe 207, pipe 205 to the same exhaust port.

The rear doors are now closed and the turnstile locked against reversal of rotation.

It is locked against all movement, if the driver so wills.

After the street collector's duties have been performed he removes his operating handle in order to use it on the next coach. He cannot remove the handle without causing the door closing action described, that is, without throwing his valve to door closed position *d c.* Therefore it is extremely unlikely that he will permit a coach to proceed with an open rear door.

From the above the following is obvious:

(1) Any door opening action (either front or rear) involves setting of the brakes, thereby making it safe to mount to, or alight from this coach. (See branch lines 189 and 213 of Fig. 4.)

(2) Only the driver is in control of the front door. (See CST² valve connections.)

(3) Operation of either the valves, CST¹ (collector's) CST³ (driver's) or TS (turnstile) to door open position *d. o.*, will serve to hold the rear door open. Hence passengers cannot be crushed by the inadvertent door closing operation of a valve by one operator, before another is finished with his duties regarding said passenger.

(4) If no passenger is ready to alight from the rear door it will not open regardless of the setting of the driver's valve. This prevents unnecessary drafts within the coach. It will open however when the street collector sets his valve to door open position. The street collector is admitting people and can open the door regardless of the setting of the driver's valve or the turnstile valve.

(5) A passenger wishing and ready to alight must wait until the door-opening mechanism is released by a proper setting of the driver's valve, that is, the passenger is a factor in the opening of the door but not the only one. Passengers cannot let themselves off.

(6) The turnstile permits only of a one direction stream of traffic through the rear door, thus expediting traffic where people tend to crowd one another back. People mounting the coach at the rear must wait until passengers have alighted.

From the above it will be seen that the several objects of the invention are attained and other advantageous results achieved.

As many modifications of the embodiments above illustrated might be made without departing from the spirit or scope of the present invention, it is intended that the above description and accompanying drawings and claims shall be interpreted as illustrative and not in a limiting sense.

We claim:

1. A door controlling system for motor coaches comprising means for opening and closing a front door under control of the coach driver, means for opening and closing the rear door controlled by the position of a passenger as regards his leaving the coach, said last named means being permitted to come into operation only upon a specific action of the said driver, said last means being adapted to be suspended by the action of an auxiliary coach operator.

2. In a passenger control system for motor coaches, comprising a coach, a front door therefor and a rear door, means for completely controlling the operation of said front door by a driver, a turnstile placed in the path to the rear door adapted to operate said rear door to open and closed position, and means in control of said driver adapted to prevent said operation of said turnstile.

3. In a passenger control system for motor coaches, comprising a coach, a front door therefor and a rear door, means for completely controlling the operation of said front door by a driver, a turnstile placed in the path to the rear door adapted to operate said rear door to open and closed position, and means in control of said driver adapted to prevent said operation of said turnstile, together with means for operating said rear door by an auxiliary operator outside of said coach independently of either said driver or said turnstile.

4. A control system for motor coaches comprising a coach, a front door therefor and a rear door, means for completely controlling the operation of said front door by a driver, a turnstile placed in the path to the rear door adapted to operate said rear door to open and closed position, and means in control of said driver adapted to prevent said operation of said turnstile, together with means for operating said rear door by an auxiliary operator outside of said coach independently of either said driver or said turnstile, and means for setting the coach brakes whenever any door thereon for entrance or exit is open.

5. A turnstile for a vehicle exit, comprising rotatable arms and a stem therefor, means for operating doors for said exit to an open and a closed position when said turnstile operates to pass one person, means for normally preventing closure of said doors when a continuous line of people pass and means for positively closing said doors when no person is passing.

6. A turnstile for a vehicle exit, comprising rotatable arms and a stem therefor, means for operating doors for said exit to an open and a closed position when said turnstile operates to pass one person, means for preventing closure of said doors when a continuous line of people pass and means for positively closing said doors when no person is passing, together with means for normally preventing reversal of rotation of said turnstile.

7. A passenger control system for a vehicle exit comprising a turnstile with rotatable arms and a stem therefor, means for operating doors for said exit to an open and a closed position when said turnstile operates to pass one person, means for preventing closure of said doors when a continuous line of people pass and means for positively closing said doors when no person is passing, together with means for normally preventing reversal of rotation of said turnstile, means for preventing operation of said turnstile under control of the vehicle driver and means, under control of an auxiliary operator, for operating said exit doors independently of said turnstile, said independent operation permitting rotation of said turnstile in either direction.

8. A motor coach comprising a lower deck, an upper deck, a front entrance to the lower deck and a rear street exit therefor, means for normally permitting only rearward traffic on said lower deck and means for suspending the operation of said said last named means when an auxiliary operator is helping to operate the coach.

9. A rear end construction for double-decked motor coaches comprising a door in one rear corner of the lower deck, a winding stairway leading from said rear corner of the lower deck to the opposite rear corner of the upper deck and an exit from said coach opposite said first named corner of said lower deck with means at said last exit for automatically opening and closing the same when a passenger leaves.

10. A motor coach comprising an enclosed lower deck and an upper deck, a front entrance for said lower deck and a rear exit therefor, means cooperating with said rear exit adapted to cause automatic opening and closing of said exit when a passenger is permitted to leave said coach and means for making said automatic opening and closing ineffective when an auxiliary operator is used.

In testimony whereof, we have signed our names to this specification this 30th day of January, 1925, and 13th day of February, 1925, respectively.

RUFUS W. BAILEY.
LLOYD R. KOENIG.